United States Patent
Chou et al.

(10) Patent No.: US 12,493,017 B2
(45) Date of Patent: Dec. 9, 2025

(54) TESTING METHOD

(71) Applicant: Ping-Yen Chou, Kaohsiung (TW)

(72) Inventors: Ping-Yen Chou, Kaohsiung (TW);
Po-Jui Su, Taichung (TW)

(73) Assignee: Ping-Yen Chou, Kaohsiung (TW)

( * ) Notice: Subject to any disclaimer, the term of this patent is extended or adjusted under 35 U.S.C. 154(b) by 285 days.

(21) Appl. No.: 18/187,763

(22) Filed: Mar. 22, 2023

(65) Prior Publication Data

US 2023/0314387 A1    Oct. 5, 2023

(30) Foreign Application Priority Data

Apr. 5, 2022   (TW) .................................. 111112958

(51) Int. Cl.
*G01N 30/06* (2006.01)
*G01N 30/72* (2006.01)
*G01N 30/02* (2006.01)

(52) U.S. Cl.
CPC ............. *G01N 30/06* (2013.01); *G01N 30/72* (2013.01); *G01N 2030/027* (2013.01)

(58) Field of Classification Search
None
See application file for complete search history.

(56) References Cited

U.S. PATENT DOCUMENTS

2003/0089664 A1*  5/2003  Phillips .................. G01N 1/405
                                                             210/644
2005/0026294 A1*  2/2005  Barber .................. G01N 33/367
                                                             422/54

FOREIGN PATENT DOCUMENTS

CN        109013678   * 12/2018
JP        2003502281  *  1/2003
WO   WO-2008028974 A1 *  3/2008  ............... C07K 1/16

* cited by examiner

*Primary Examiner* — John E Breene
*Assistant Examiner* — Alex T Devito
(74) *Attorney, Agent, or Firm* — Best & Flanagan LLP

(57) ABSTRACT

A testing method, the steps comprising: providing a liquid chromatograph and an inductively coupled plasma mass spectrometer in series; preparing a solution of a test substance containing a concentration of the substance in the PPm to PPb range, continuously perfusing the test solution into a liquid chromatography column; and obtaining a penetration curve of the substance for the penetration ratio and time, and the penetration ratio value for the penetration curve of the substance gradually increases with time and tends to be stable; the present invention continuously perfuses the sample into the column through the combination of LC-ICP-MS, and uses ICP-MS to observe the standard of the known metallic state between the same or different columns, so that the metal in the sample can be determined as a metallic ion, metallic complex ion, metallic chelate molecule, or metallic particle.

4 Claims, 4 Drawing Sheets

TESTING METHOD

FIELD OF THE INVENTION

The present invention is related to a testing method, more particularly to a testing method which is able to distinguish types of metallic components in samples in extremely low concentrations.

BACKGROUND OF THE INVENTION

Taiwan is the heart of the global semiconductor industry, ahead of the United States, China, and other countries. A semiconductor is a material with conductivity between insulator and conductor, usually using silicon or germanium as the material, after adding specific elements (such as arsenic, phosphorus, boron, etc.) can become different forms of semiconductors, which are used as light detectors, amplifiers, rectifiers, and then applied to electronic products, communications, industrial instruments, and other fields, no matter from the perspective of both technology or economic development, semiconductors play a very important role.

The semiconductor manufacturing process requires many steps, such as cutting, grinding, etching, polishing, cleaning, inspection, packaging, and so on. During the process, various chemical or organic solvents, such as acidic and alkaline solutions, are used, which are indispensable in the manufacturing of semiconductors and may leave impurities and specific pollutants, especially very small amounts of metal elements, and these unnecessary trace metal elements may cause performance degradation or defects of semiconductor products. Therefore, the determination of ultra-trace metal content in chemical solutions used in the manufacturing process and the inspection of the cleanliness of the semiconductor products are indispensable steps in the manufacturing of semiconductors.

However, the difficulty of the current testing technology is that the concentration of these ultra-trace metal elements is usually in the units of PPm (Part Per Million, $10^{-6}$) to PPb (Part Per Billion, $10^{-9}$), which is already very difficult to determine, and the process of detection also needs to determine whether the metal element is a metallic ion, complex ion, chelate molecule or particle at the same time, which becomes the biggest difficulty in the current testing technology.

SUMMARY OF THE INVENTION

In order to solve the problem that the current technology cannot effectively test the ultra-trace metal elements contained in the raw materials in the semiconductor process as metallic ions, complex ions, chelate molecules, or particles, the present invention provides a testing method, the steps of which include:

providing a liquid chromatograph and an inductively coupled plasma mass spectrometer in series, wherein the liquid chromatograph comprises a liquid chromatography column;

preparing a solution of a test substance containing a solution with the test substance, continuously perfusing the solution into the liquid chromatography column, the concentration of the test substance in the solution being a concentration in the range of PPM to PPb, the test substance comprising metallic ions, metallic complex ions, and metallic chelate molecules or metallic particles; and until a penetration curve is obtained for the penetration ratio and time of the test substance, the penetration ratio value of the penetration curve for the test substance gradually increases with time and tends to be stable.

In accordance, the present invention has the following beneficial effects and advantages as followings:

1. The present invention uses liquid chromatography (LC) and an inductively coupled plasma mass spectrometer (ICP-MS) in series with three testing devices of LC-ICP-MS, and The sample is continuously poured into the LC column with a special perfusion method, instead of being pushed a small amount of the sample by using the eluent, and then the ICP-MS is used to observe the difference in penetration time between the standard sample and the perfused sample of known metallic state in the same or different columns so that it can determine whether the metal elements in the sample contain a metallic ion, a complex ion, a chelate molecule or particle.

2. The present invention uses a special method of continuous perfusion to continuously pour the sample into the LC column, which can improve the current LC analysis method in which the sample is pushed by the eluent, which may change (e.g., over-dilute or flush) the state of the analyte, resulting in inaccurate test results, or only a person with considerable experience can judge the reasonableness of the data in a speculative manner.

Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

DESCRIPTION OF THE PREFERRED EMBODIMENTS

Figure 1:
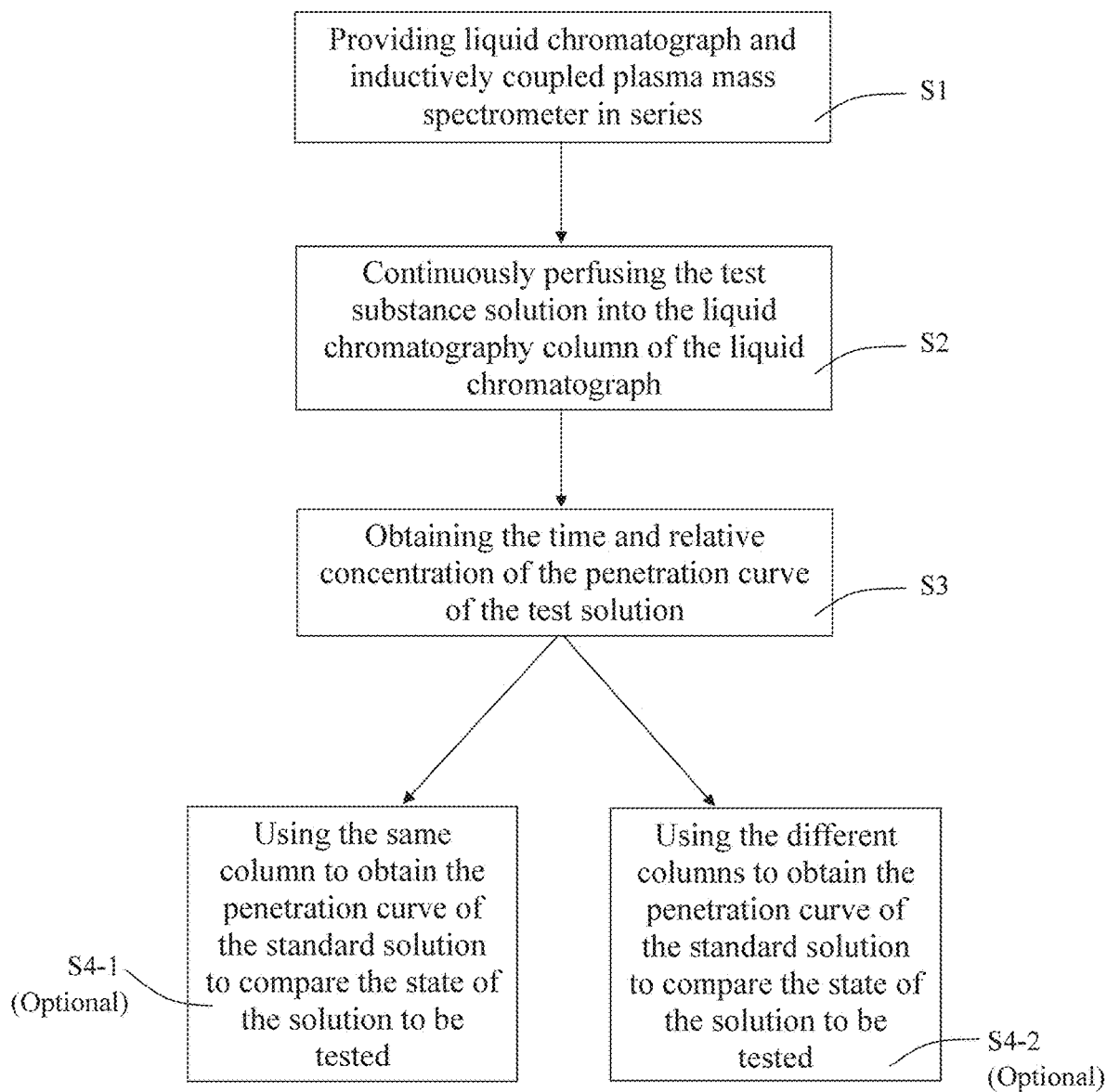
FIG. 1 shows the flow chart of the steps of the preferred embodiment of the analytical method of the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

Preferred Embodiment of Analytical Method

Referring to FIG. 1, the present invention provides a method of analysis, the steps of which comprise:

Step S1) providing a liquid chromatograph and an inductively coupled plasma mass spectrometer in series, wherein the liquid chromatograph comprises a liquid chromatography column;

The ICP-MS as aforementioned is an analytical technique that combines ICP technology and MS mass spectrometry. ICP uses a high power high-frequency radio frequency signal applied to the inductor coil to form a high-temperature plasma inside the coil, and through the pushing of the gas to ensure the equilibrium and continuous ionization of the plasma, the analyzed sample is sent by a peristaltic pump into the atomizer to form an aerosol, which is carried by the carrier gas into the central area of the plasma torch to evaporate, decompose, excite and ionize. The high temperature of the plasma causes most of the elements in the sample to ionize an electron and form a monovalent positive ion, and then the ionized ions in the plasma are transmitted to the mass spectrometer through the ICP-MS interface. Mass spectrometry is a mass filter and analyzer that detects the intensity of an ion by selecting ions with different mass-to-charge ratios (m/z), and then analyzes and calculates the intensity of an element.

Step S2) preparing a solution of a test substance containing a solution with the test substance, and continuously perfuse the solution of the test substance into the liquid phase chromatography column of the liquid chromatograph. The concentration of the test substance in the test substance solution is likely to be in the PPm to PPb range, the test substance is preferably a metal comprising iron, calcium, silver, or chromium, and the solvent used in the test substance solution is preferred to be an acid, alkaline, water or chelating agent (e.g. EDTA) solution; and Step S3) continuously perfusing the test substance solution into the liquid chromatography column until a penetration curve with the penetration ratio (%) and penetration time (mins) is obtained, and the penetration ratio value of the penetration curve for the test substance solution gradually increases with time and gradually tends to be stable.

After obtaining the penetration curve of the solution to be tested, the present invention is preferably compared with the penetration curves of a standard solution in the following two ways:

Step S4-1) (Optionally) After obtaining the penetration curve of the test substance solution, a standard solution is also continuously perfused into the same liquid chromatography column and obtained a penetration curve of the standard solution for the penetration ratio and time. By comparing the curve similarity and difference of the penetration curves between the test substance solution and the standard solution, then determined that the test substance may be a metallic ion, a complex ion, a chelate molecule or particle state.

Step S4-2) (Optionally) After obtaining the penetration curve of the test substance, perfuse the standard solution into another identical or different liquid chromatography column and observed and measured by the inductively coupled plasma mass spectrometer to obtain the penetration curve of a standard solution with the penetration ratio (%) and the penetration time (min). By comparing the curve similarity and difference of the penetration curves between the test substance solution and the standard solution, then determined that the test substance may be a metallic ion, a complex ion, a chelate molecule or particle state.

Wherein, the liquid chromatography column is preferably a polytetrafluoroethylene (PTFE, Teflon®) column, a cation exchange resin column, and/or an anion exchange resin column.

The standard solution is water, acidic or alkaline aqueous solution, or organic solution when the test substance is already known. For example, when the test substance is iron and is to be determined as ionic state, particulate state, or chelate state, the standard solution may use a strong acid solution of iron (e.g., pH=1) and is known to be in the ionic state of iron, and an aqueous solution of iron and is known to be in the particulate state of iron in the aqueous solution, and these two iron ions and iron particulates are analyzed by continuous perfusion of the standard solution and obtain the penetration curve of the standard solution for comparing the similarity or difference of the penetration curve of the test substance solution.

The characteristic of the PTFE column is that it can absorb metallic particles to make them penetrate more slowly, but it does not adsorb ions, complex ions, and chelated metals. Cation exchange resin can adsorb positively charged ions, and anion exchange resin column can absorb negatively charged complex ions.

Furthermore, in order to improve the accuracy of the test method, the present invention preferably pre-treats the liquid chromatography column before performing the aforementioned step S1, and the said pre-treatment is acid washing or alkaline washing of the column. In this way, the absorption or gripping capacity of the liquid chromatography column will be improved, and the stability and accuracy of the test will be enhanced.

<Validity Test 1>

The present invention uses the previously provided test method to test possible impurity patterns in semiconductor raw materials with PPb-level concentrations of iron metals that may have undergone strong acid treatment during the semiconductor manufacturing process.

Figure 2:
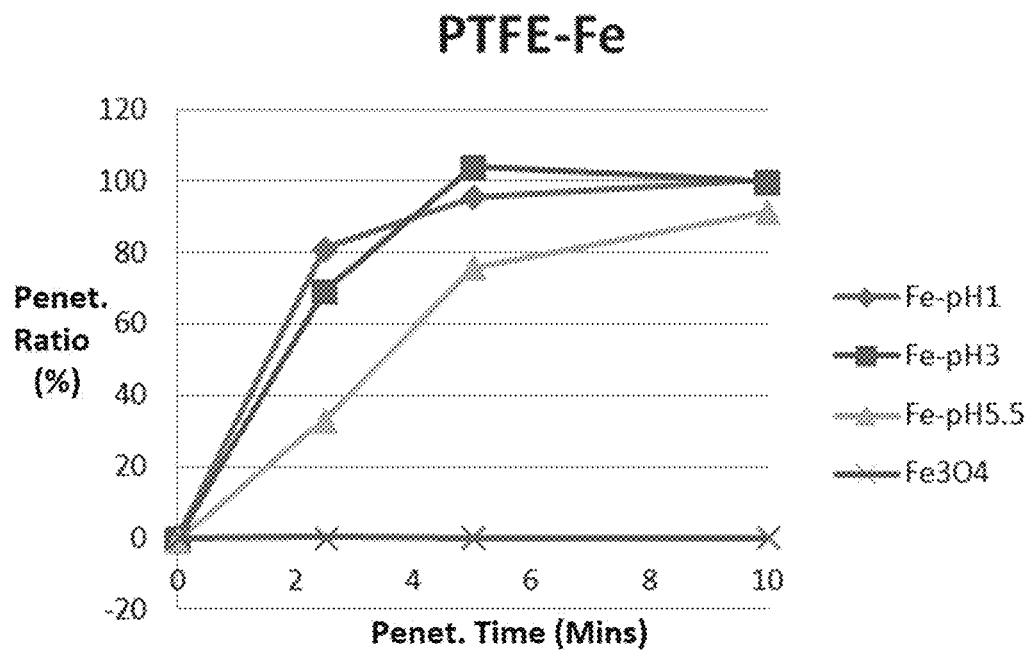
FIG. 2 shows the penetration curves of penetration ratios and penetration times for the validity test 1 of the present invention for the solution containing the test substance and the standard solution, respectively.

Step S1) providing LC-ICP-MS in a series; wherein the liquid chromatograph of this embodiment uses a PTFE column;

Step S2) preparing two solutions of the iron-containing test substance with different strong acid solvents of pH 3 and 5.5 respectively, and perfuse the two solutions of the iron-containing test substance into the liquid chromatography column of the liquid chromatograph respectively but continuously; and Step S3) Continuing to perfuse the two iron-containing test solutions until they appear as Fe-pH3 and Fe-pH5.5 in FIG. 2, which are the penetration curves of the two iron-containing test solutions with the penetration ratio and time (shown as penet. ratio and penet. time as initial in the figures).

Step S4-1) Perfusing two standard solutions with the same PTFE column. The first standard solution prepared in this embodiment contains a strong acid solution containing iron at pH 1, and the iron component is known to be in an ionic state under the acidic solution at pH 1. The second standard solution is an aqueous solution containing iron, and the iron component is known to be in an iron particle state in a neutral aqueous solution. Perfusing the two standard solutions separately but continuously until the penetration curves are generated to obtain their penetration ratio and time. The penetration curves of the first standard solution and the second standard solution are indicated as Fe-pH1 and Fe3O4, respectively, as shown in FIG. 2.

From the comparison of FIG. 2, it can be seen that the penetration curves of Fe-pH3 and Fe-pH5.5 of the two iron-containing solutions to be tested are close to the penetration curves of Fe-pH1 of the first standard solution, so it can be concluded that the iron metal with the concentration of PPb level may be treated with strong acid in the semiconductor manufacturing process where the iron state is an ionic state.

<Validity Test 2>

The present invention uses the test method provided above to test possible impurity patterns after treatment with choline for PPb-level concentration of iron metal in semiconductor raw materials.

Figure 3A:
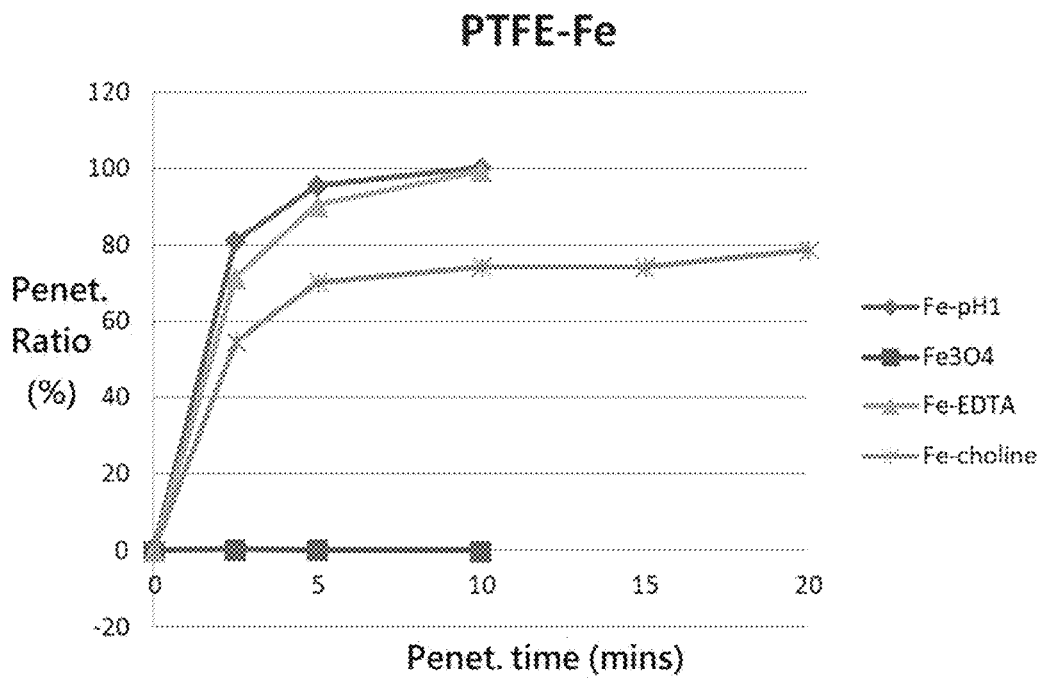
FIGS. 3A and 3B show the penetration curves of penetration ratios and penetration times for the validity test 2 of the present invention using the different liquid chromatography columns for the solution containing the test substance and the standard solution, respectively.

Step S1) providing LC-ICP-MS in a series; wherein the liquid chromatograph of this embodiment uses a PTFE column the first time;

Step S2) preparing a solution of the iron-containing test substance with choline as the solvent, and continuously perfusing the iron-containing test substance solution into the liquid chromatography column of the liquid chromatograph; and Step S3) continuing to perfuse the iron-containing test solution until the Fe-choline curve appears as indicated in FIG. 3A, which is the penetration curve of the penetration ratio and time of the iron-containing test solution.

Step S4-1) perfusing three standard solutions with the same PTFE column. The first standard solution prepared in this embodiment contains a strong acid solution containing iron at pH 1, and the iron component is known to be in an ionic state under the acidic solution at pH 1. The second standard solution is an neutral aqueous solution containing Fe3O4 particles. The third standard solution is an EDTA chelate solution of iron, and the iron component is known to be in a chelated state in the EDTA solution. Perfusing the three standard solutions separately but continuously until the penetration curves are generated to obtain their penetration ratio and time. The penetration curves of the first standard solution, second standard solution, and third standard solution are indicated as Fe-pH1, Fe3O4, and Fe-EDTA, respectively, as shown in FIG. 3A.

Figure 3B:
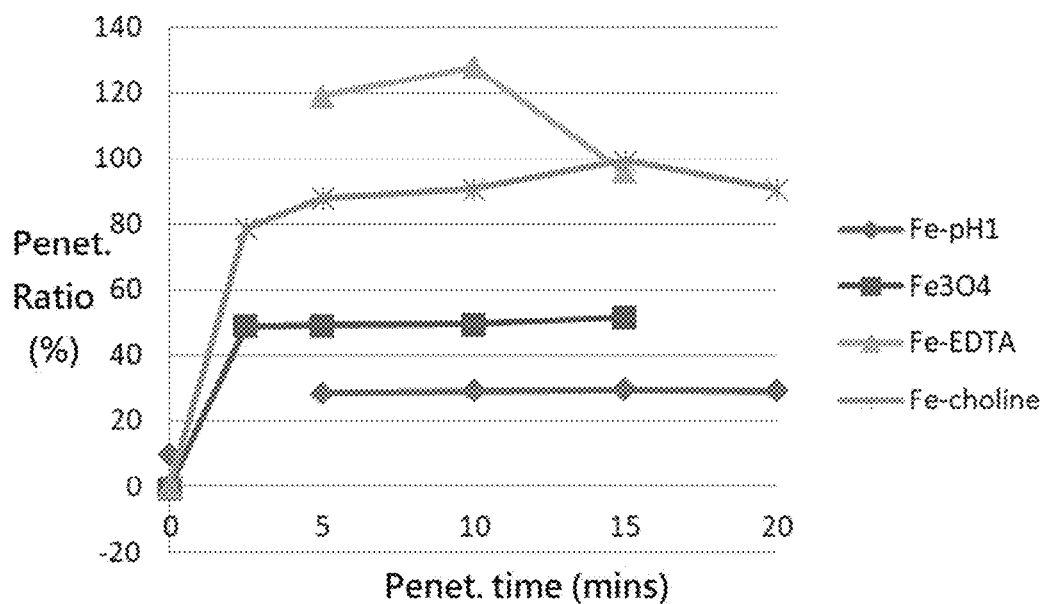

Step S4-2) re-perfusing the said iron-containing test substance solution and the three standard solutions with different cationic columns (650H), and the penetration curves of the iron-containing test solution, the first standard solution, the second standard solution, and the third standard solution are indicated as Fe-choline, Fe-pH1, Fe-304, and Fe-EDTA, respectively, as shown in FIG. 3B.

First of all, from FIG. 3A, it can be initially inferred that the iron-containing test solution is more likely to be ionic or chelated state, but because its penetration curve is still slightly different from that of the ionic or chelated state of the standard solutions, further comparison with FIG. 3B shows that the penetration curve of the iron-containing test solution is close to the penetration curve of the chelated state (third standard solution), so it can be determined that the PPb level concentration of iron metal is in the chelated state after treatment with choline.

<Validity Test 3>

The present invention uses the test method above to test possible impurity patterns in semiconductor raw materials with PPb-level concentration of calcium metals after possible treatment with choline in the semiconductor manufacturing process.

Figure 4A:
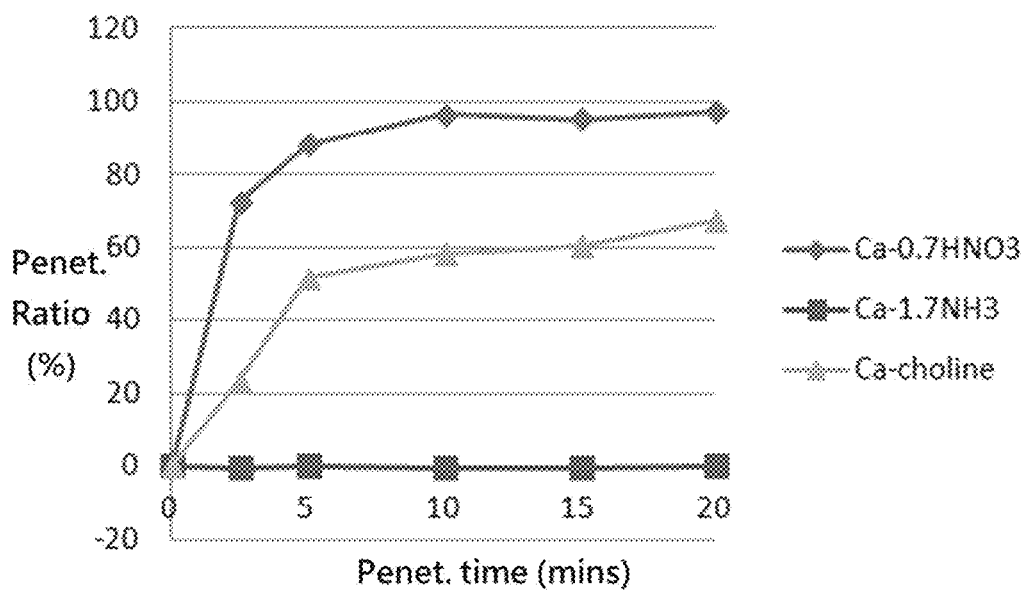
FIGS. 4A and 4B show the penetration curves of penetration ratios and penetration times for the validity test 3 of the present invention using the different liquid chromatography columns for the solution containing the test substance and the standard solution, respectively.

Step S1) providing LC-ICP-MS in a series; wherein the liquid chromatograph of this embodiment uses the PTFE column;

Step S2) preparing a solution of the calcium-containing test substance with choline as the solvent, and continuously perfusing the calcium-containing test substance solution into the liquid chromatography column of the liquid chromatograph; and Step S3) continuing to perfuse the calcium-containing test solution until the Ca-choline curve appears as indicated in FIG. 4A, which is the penetration curve of the penetration ratio and time of the calcium-containing test solution.

Step S4-1) perfusing calcium-containing test solution and two standard solutions with the same PTFE column. The first standard solution prepared in this embodiment contains calcium nitric acid solution with a concentration of 0.7%, and the calcium component is known to be in an ionic state under the 0.7% nitric acid solution, and the second standard solution is calcium ammonia solution with a concentration of 1.7%, and the calcium component is known to be in a calcium particle state in the ammonia solution. Perfusing the two standard solutions separately but continuously until the penetration curves are generated to obtain their penetration ratio and time. The penetration curves of the calcium-containing test solution, the first standard solution, and the second standard solution are indicated as Ca-choline, Ca-0.7HNO3, and Ca-1.7NH3, respectively, as shown in FIG. 4A.

Figure 4B:
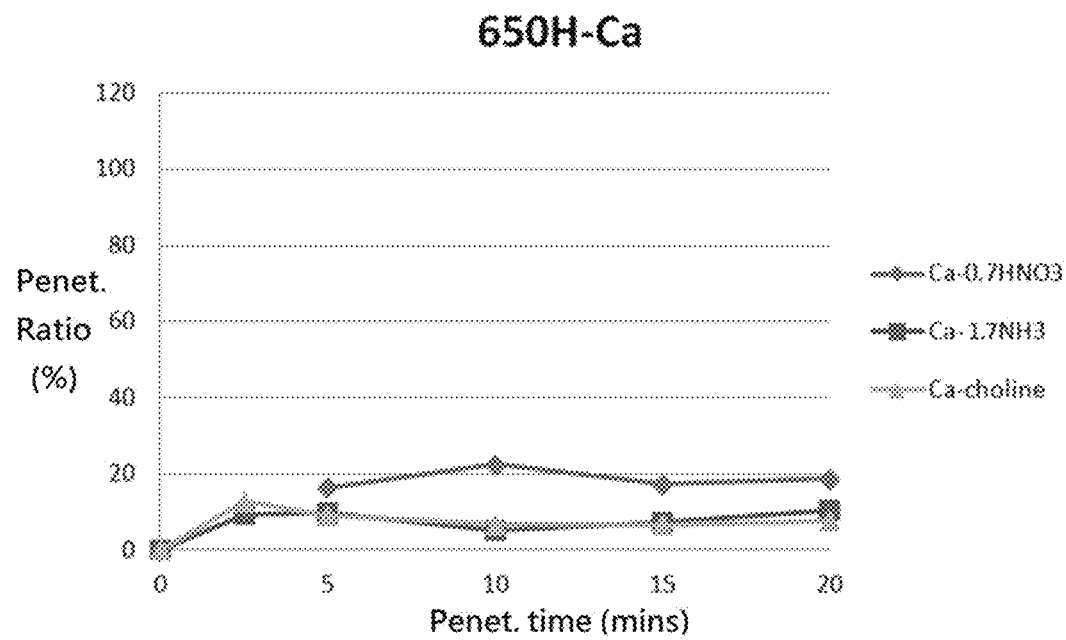

Step S4-2) re-perfusing the said calcium-containing test substance solution and two standard solutions with different cationic columns (650H), and the penetration curves of the calcium-containing test solution, the first standard solution, and the second standard solution are indicated as Ca-choline, Ca-0.7HNO3, and Ca-1.7NH3, respectively, as shown in FIG. 4B.

First of all, from FIG. 4A, it can be initially inferred that the calcium-containing test solution is not in the particulate state, but since its penetration curve is still slightly different from that of the ionic state of the standard solutions, it cannot exclude that it may be in the chelated state. Further comparison with FIG. 4B shows that the penetration curve of the calcium-containing test solution and the standard solutions in the ionic state are highly adsorbed by the cationic column (650H), so it can be determined that the PPb level concentration of calcium metal is in the ionic state after treatment with choline.

<Validity Test 4>

The present invention uses the test method above to test possible impurity patterns in semiconductor raw materials with PPb-level concentration of silver metals after possible treatment with neutral water or hydrochloric acid in the semiconductor manufacturing process.

Figure 5:
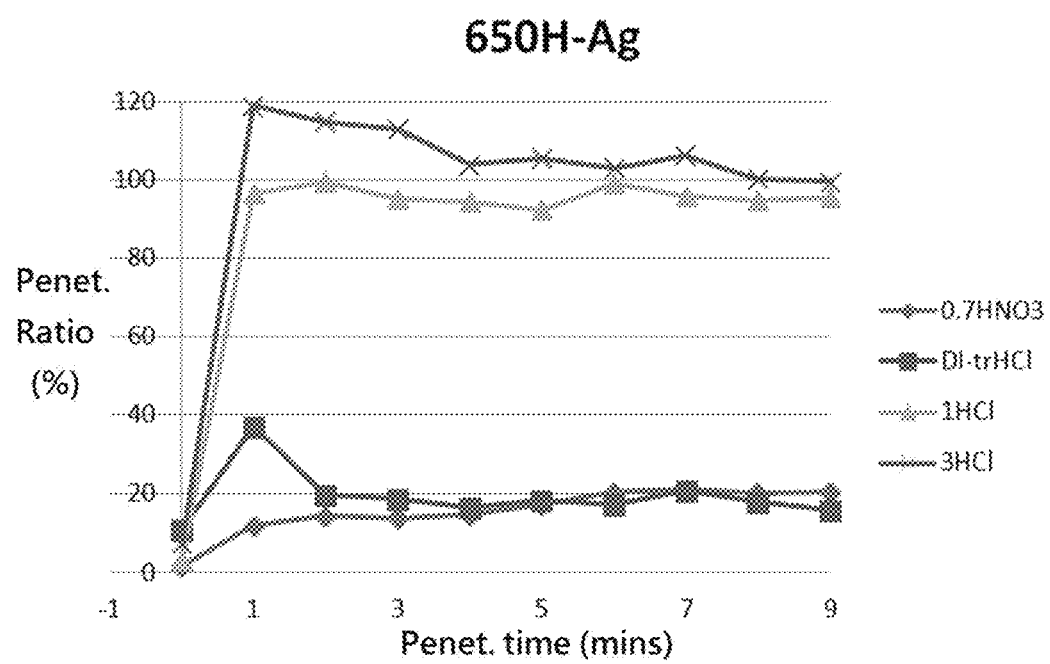
FIG. 5 shows the penetration curves of penetration ratios and penetration times for the validity test 4 of the present invention for the solution containing the test substance and the standard solution, respectively.

Step S1) providing LC-ICP-MS in a series; wherein the liquid chromatograph of this embodiment uses the cationic column (650H);

Step S2) preparing silver-containing DI aqueous solution and silver-containing 1% hydrochloric acid solution as the test solution respectively, and continuously perfusing the two silver-containing test solutions into the liquid chromatography column of the liquid chromatograph; and Step S3) perfusing the two silver-containing test solutions separately but continuously until the two curves indicated DI-trHCL and 1% HCl appear in FIG. 5, which are the penetration curves of the penetration ratio and time of the silver-containing test solution with water as the solvent and the silver-containing test solution with acid as the solvent, respectively.

Step S4-1) perfusing the two standard solutions with the same cationic column (650H). The first standard solution prepared in this embodiment contains a silver nitric acid solution with a concentration of 0.7%, and the silver component is known to be in a cationic state under the 0.7% nitric acid solution, and the second standard solution is a silver in hydrochloric acid with a concentration of 3%, and the silver component is known to be trichloride complex anion. Perfusing the two standard solutions separately but continuously until the penetration curves are generated to obtain their penetration ratio and time. The penetration curves of the first standard solution and the second standard solution are indicated as 0.7HNO3 and 3HCl, respectively, as shown in FIG. 5.

From the comparison of FIG. 5, it can be seen that the penetration curves of DI-trHCL and 1HCl of the two silver-containing solutions to be tested are respectively close to the penetration curves of 0.7HNO3 (on the top) and 3HCl (on the bottom) of the first standard solution and the second standard solution, so it can be concluded that the silver metal with the concentration of PPb-level is in a cationic state in the DI aqueous solution and in an anionic state in the 1% hydrochloric acid process solution in the semiconductor manufacturing process.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A testing method for identifying the chemical state of metallic species in an ultra-trace concentration, comprising the steps of:

providing a liquid chromatograph and an inductively coupled plasma mass spectrometer in series, wherein the liquid chromatograph comprises a liquid chromatography column;

preparing a solution of a test substance containing a solution containing the metallic species and, continuously perfusing the solution into the liquid chromatography column, the concentration of the test substance in the solution being a concentration in the range of PPM to PPb, the metallic species are one of: metallic ions, metallic complex ions, metallic chelate molecules or metallic particles; and measuring an eluted fraction of the solution by the ICP-MS to obtain a penetration curve plotting penetration ratio versus time, the penetration ratio value of the penetration curve for the test substance gradually increases with time and tends to be stable;

after obtaining the penetration curve of the test substance, a standard solution is perfused into the same liquid chromatography column or another liquid chromatography column, and obtaining a penetration curve of the standard substance for the penetration ratio and time, a presence of metallic species is determined by comparing differences in retention time and penetration ratio profile between the penetration curves of the test substance and the standard substance.

2. The testing method according to claim 1, wherein: a pretreatment is performed on the liquid chromatography column prior to perfusing the solution to be tested, the pretreatment comprising acid washing or alkaline washing of the liquid chromatography column.

3. The testing method according to claim 1, wherein: the liquid chromatography column comprises a polytetrafluoroethylene column, a cation exchange resin column, and/or an anion exchange resin column.

4. The testing method according to claim 1, wherein: the metal contains silver, iron, calcium, or chromium.

* * * * *